United States Patent
Itakura et al.

(10) Patent No.: US 12,409,817 B2
(45) Date of Patent: Sep. 9, 2025

(54) BRAKE CONTROL DEVICE AND BRAKE CONTROL METHOD

(71) Applicant: Hitachi Astemo, Ltd., Hitachinaka (JP)

(72) Inventors: Kyoshiro Itakura, Tokyo (JP); Takahiro Ito, Tokyo (JP); Kenichiro Matsubara, Hitachinaka (JP); Daisuke Goto, Hitachinaka (JP); Makoto Matsuura, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 895 days.

(21) Appl. No.: 17/433,088

(22) PCT Filed: Oct. 17, 2019

(86) PCT No.: PCT/JP2019/040901
§ 371 (c)(1),
(2) Date: Aug. 23, 2021

(87) PCT Pub. No.: WO2020/179122
PCT Pub. Date: Sep. 10, 2020

(65) Prior Publication Data
US 2022/0041144 A1   Feb. 10, 2022

(30) Foreign Application Priority Data
Mar. 5, 2019 (JP) .................. 2019-039401

(51) Int. Cl.
*B60T 8/171* (2006.01)
*B60T 13/74* (2006.01)
(Continued)

(52) U.S. Cl.
CPC ............ *B60T 8/171* (2013.01); *B60T 13/746* (2013.01); *B60T 17/221* (2013.01); *F16D 66/00* (2013.01);
(Continued)

(58) Field of Classification Search
CPC ...... B60T 8/171; B60T 17/221; B60T 13/746; F16D 66/00; F16D 2066/005; F16D 2121/24
See application file for complete search history.

(56) References Cited

U.S. PATENT DOCUMENTS 8,239,100 B2 * 8/2012 Ueno ..................... F16D 65/18
  188/72.3
8,676,409 B2 * 3/2014 Takeda ................. B60T 13/741
  701/7
(Continued)

FOREIGN PATENT DOCUMENTS

JP   2005-106153 A   4/2005
JP   2007-161154 A   6/2007
(Continued)

OTHER PUBLICATIONS

International Search Report with English translation and Written Opinion issued in corresponding application No. PCT/JP2019/040901 dated Dec. 10, 2019.

*Primary Examiner* — Vishal R Sahni
(74) *Attorney, Agent, or Firm* — Foley & Lardner LLP (57) ABSTRACT

There are provided a brake control device and a brake control method capable of estimating a rigidity change due to a temperature change, uneven wear of a brake pad, an inclination of a brake disc, or the like with a low memory load and with high accuracy up to a region with larger thrust than a measurement range. A brake control device controls a braking unit including a friction member pushed on a braking target member, a piston that abuts on the friction member and moves in a linear motion direction by rotation of an electric motor, and a thrust detection unit that detects thrust of the friction member to the braking target member. The brake control device estimates a relation between a piston position being rigidity of the braking unit, and the (Continued)

thrust, based on a first piston range that is a thrust change as a first inclination with respect to the piston position, and a second piston range that is a thrust change as a second inclination different from the first inclination, with respect to the piston position.

8 Claims, 7 Drawing Sheets

(51) Int. Cl.
- *B60T 17/22* (2006.01)
- *F16D 66/00* (2006.01)
- F16D 55/226 (2006.01)
- F16D 121/24 (2012.01)
- F16D 125/40 (2012.01)

(52) U.S. Cl.
CPC ...... *F16D 55/226* (2013.01); *F16D 2066/005* (2013.01); *F16D 2066/006* (2013.01); *F16D 2121/24* (2013.01); *F16D 2125/40* (2013.01)

(56) References Cited

U.S. PATENT DOCUMENTS

| | | | |
|---|---|---|---|
| 9,145,121 B2 * | 9/2015 | Jungbecker | B60T 8/885 |
| 9,604,622 B2 * | 3/2017 | Yasui | B60T 13/741 |
| 2007/0138861 A1 | 6/2007 | Kawahara et al. | |
| 2008/0048596 A1 | 2/2008 | Konishi et al. | |
| 2011/0246039 A1 * | 10/2011 | Takeda | F16D 65/18 |
| | | | 701/70 |
| 2020/0173508 A1 * | 6/2020 | Michels | B60T 11/34 |

FOREIGN PATENT DOCUMENTS

| | | | | |
|---|---|---|---|---|
| JP | 2008-049800 A | 3/2008 | | |
| JP | 2008-184023 A | 8/2008 | | |
| JP | 2014177204 A * | 9/2014 | | B60T 13/741 |
| WO | WO-2012049050 A1 * | 4/2012 | | B60T 13/12 |

* cited by examiner

BRAKE CONTROL DEVICE AND BRAKE CONTROL METHOD

TECHNICAL FIELD

The present invention relates to a configuration and a control of a brake system, and particularly relates to a technique effective for application to an electric brake of an automobile requiring high control accuracy and responsiveness.

BACKGROUND ART

A vehicle such as an automobile is equipped with a brake system that applies braking power to a wheel in accordance with according to a stepping quantity of a brake pedal by a driver. There are many brake systems of hydraulic systems in the related art, but recently, brake systems of electric systems becomes more.

In the brake system using the electric system, it is possible to pull back a brake piston, which is difficult in the hydraulic system. Thus, it is possible to perform clearance control of providing a desired gap between a brake pad and a brake disc, and it is possible to expect improvement of fuel efficiency by reducing drag of the brake pad.

When a pedal is stepped, after a contact with the brake pad by the clearance control, the braking power is controlled using a pressing force between the brake pad and the brake disc, which is detected by a strain sensor or the like.

In this control, by performing control based on the rigidity characteristic of a caliper representing a relation between the position of the brake piston and the braking power, a technique of controlling the braking power with high response and high accuracy, enhancing safety, and improving the brake feel is important.

As a technique of using the rigidity characteristic of the caliper for control, for example, there is a technique as disclosed in PTL 1. PTL 1 discloses "a brake control device of a vehicle including: brake control means for independently controlling a movement amount of a brake friction material in brake means for generating braking power on a wheel for each wheel; storage means for storing drive data required for controlling the movement amount; a vehicle traveling state detection means for detecting a physical amount representing a vehicle traveling state; and vehicle control means for controlling the vehicle traveling state via the brake control means for each wheel based on the physical amount, in which the vehicle control means acquires control data as a result of controlling the vehicle traveling state of the vehicle by the brake means, corrects and updates the drive data stored in the storage means by using the acquired control data so that it is possible to generate an equivalent pressing force on left and right wheels regardless of variations in a value of a current sensor or a change in rigidity of an actuator due to an aged change of a brake actuator".

PTL 2 discloses "an electric brake device that includes an electric motor, a caliper in which a pushing member that pushes a brake pad on a brake disc is propelled by the electric motor, and control means for calculating a pushing force command value of the brake pad by the pushing member in accordance with a braking instruction signal and controlling the electric motor based on the pushing force command value, in which the control means estimates thrust of the pushing member from a rotational position of the electric motor, the control means includes caliper rigidity estimation means for estimating rigidity of the caliper in accordance with a frequency of the pushing member pushing the brake pad and changing the pushing force command value of the brake pad, which is calculated by the braking instruction signal, in response to a result of estimating the rigidity, so that desired braking power may be generated even though the rigidity of the caliper changes in the electric brake device that estimates the thrust of the pushing member from the rotational position of the electric motor".

PTL 3 discloses "a brake device including: a thrust mechanism that causes a disk rotor to push a brake pad; an actuator that drives the thrust mechanism, pushing-force detection means for detecting a pushing force by the thrust mechanism; position detection means for detecting displacement of the thrust mechanism; and control means for controlling the actuator required to generate braking power in accordance with a pushing-force signal of the pushing-force detection means and a braking instruction signal of a vehicle, in which the control means includes abnormality detection means for detecting abnormality of the pushing-force detection means based on a relative relation between the pushing-force signal of the pushing-force detection means and a displacement signal of the position detection means so that it is possible to detect abnormality of a piston thrust sensor with high accuracy.

CITATION LIST

Patent Literature

PTL 1: JP 2007-161154 A
PTL 2: JP 2008-184023 A
PTL 3: JP 2005-106153 A

SUMMARY OF INVENTION

Technical Problem

In PTL 1, by updating rigidity graph data based on data of a vehicle movement during a vehicle stabilization control, a rigidity change due to aged deterioration or the like is handled, and control performance of the vehicle stabilization control is improved. However, according to this configuration, the vehicle movement becomes unstable and then the update is performed as a result of braking. Thus, there is a concern that the safety is deteriorated when the rigidity changes quickly.

In addition, in PTL 2, by acquiring the rigidity characteristic from measurement values of a position sensor and a thrust sensor and changing the rigidity characteristic in accordance with a length of the data acquisition interval, it is possible to appropriately estimate the rigidity change with respect to a temperature change and improve controllability. However, since a rigidity table is created based on the measurement values, it is difficult to estimate the rigidity characteristic in a high thrust region which has not been generated at the time of braking in the previous cycle with high accuracy. In addition, since the rigidity characteristic changes in accordance with a time interval, it is possible to appropriately estimate only the temperature change of the caliper, and it is difficult to estimate the change that does not depend on time, such as uneven wear of the brake pad and the inclination of the brake disc.

PTL 3 discloses an example in which the rigidity characteristic is used in failure determination of the thrust sensor, and discloses that the rigidity characteristic is created by polynomial approximation of a plurality of measurement points. According to the rigidity estimation method in PTL 3, there is a concern that the rigidity estimation accuracy is reduced due to an approximation error, and there is a possibility that a memory load increases because analysis of multiple measurement points is required for high accuracy.

Therefore, an object of the present invention is to provide a brake control device and a brake control method capable of estimating a rigidity change due to a temperature change, uneven wear of a brake pad, an inclination of a brake disc, or the like with a low memory load and with high accuracy up to a region with larger thrust than a measurement range.

Solution to Problem

In order to solve the above problems, according to the present invention, a brake control device controls a braking unit including a friction member pushed on a braking target member, a piston that abuts on the friction member and moves in a linear motion direction by rotation of an electric motor, and a thrust detection unit that detects thrust of the friction member to the braking target member. A relation between a piston position being rigidity of the braking unit, and the thrust is estimated based on a first piston range that is a thrust change as a first inclination with respect to the piston position, and a second piston range that is a thrust change as a second inclination different from the first inclination, with respect to the piston position.

According to the present invention, there is provided a brake control method of controlling an electric motor of a braking unit that pushes a friction member. The brake control method includes estimating a relation between a piston position being rigidity of the braking unit and thrust, based on a first piston range that is a thrust change as a first inclination with respect to a piston position, and a second piston range that is a thrust change as a second inclination different from the first inclination, with respect to the piston position.

Advantageous Effects of Invention

According to the present invention, it is possible to provide a brake control device and a brake control method capable of estimating a rigidity change due to a temperature change, uneven wear of a brake pad, an inclination of a brake disc, or the like with a low memory load and with high accuracy up to a region with larger thrust than a measurement range.

Thus, it is possible to perform stable brake control regardless of a rigidity change, and to improve safety and feeling at the time of braking.

Objects, configurations, and advantageous effects other than those described above will be clarified by the descriptions of the following embodiments.

DESCRIPTION OF EMBODIMENTS

Hereinafter, embodiments of the present invention will be described with reference to the drawings. In the drawings, the same components are denoted by the same reference signs, and the detailed description of the repetitive parts will be omitted. The present invention is not limited to the following embodiments, and various modifications and application examples are also included in the scope of the technical concept of the present invention.

Embodiment 1

Figure 1:
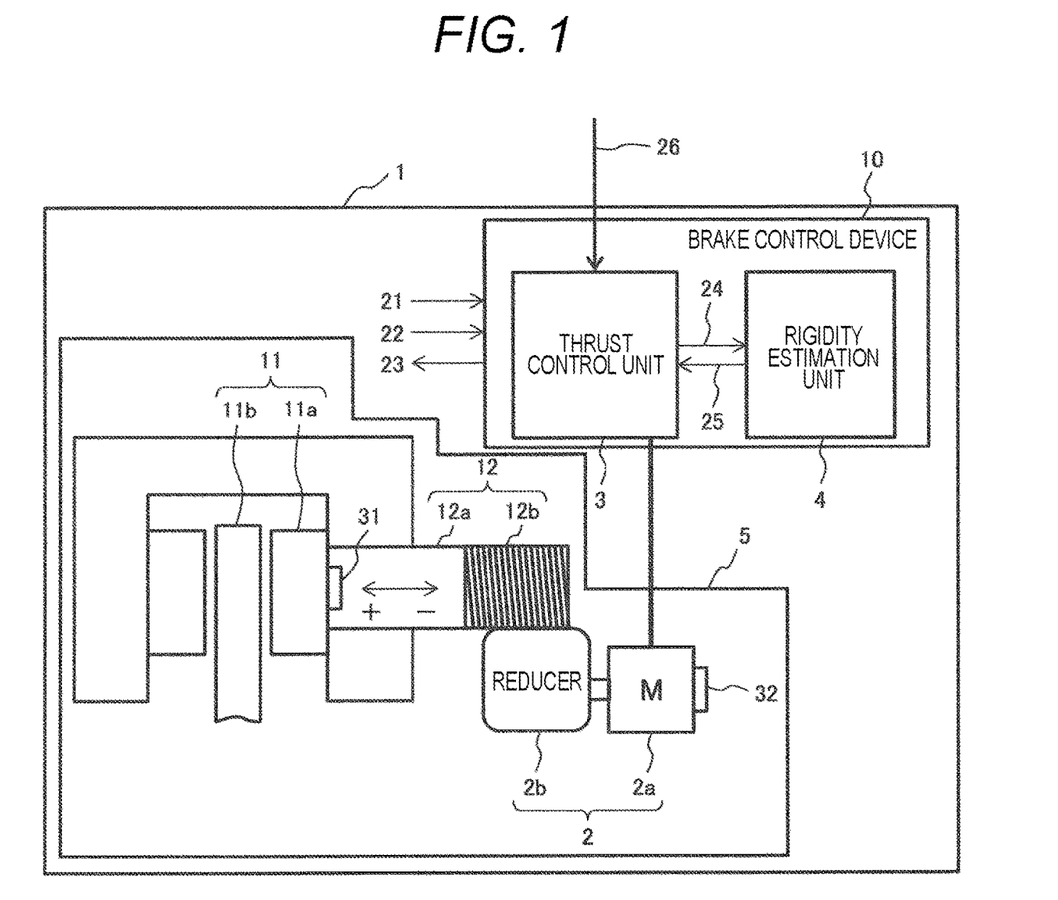
FIG. 1 is a schematic diagram of a brake system according to Embodiment 1.

A brake system according to Embodiment 1 of the present invention will be described with reference to FIGS. 1 to 6. FIG. 1 is a schematic diagram of a brake system of the present embodiment, and illustrates a configuration corresponding to an electric brake for one wheel among a plurality of wheels of a vehicle.

As illustrated in FIG. 1, in the present embodiment, a brake system 1 includes a drive mechanism 2, a brake control device 10, a braking mechanism 11, and a rotation/linear motion conversion mechanism 12 as main components. Among the components, the drive mechanism 2 includes an electric motor 2a and a reducer 2b. The brake control device 10 includes a thrust control unit (motor controller) 3 and a rigidity estimation unit 4 mounted therein. The braking mechanism 11 is disposed so that a brake pad (friction member) 11a and a brake disc (braking target member) 11b can be brought into and out of contact with each other. The rotation/linear motion conversion mechanism 12 includes a piston 12a and a feed screw 12b, and has a substantially rod shape in the present embodiment.

In FIG. 1, a unit (braking unit) including the drive mechanism 2, the brake pad 11a, and the rotation/linear motion conversion mechanism 12 is referred to as a brake caliper 5. The brake caliper 5 has a role of pressing the brake pad 11a against the brake disc 11b, and enables braking by friction.

In the brake system 1, a rotational driving force generated by the electric motor 2a is decelerated by the reducer 2b, the decelerated rotational driving force is converted into a linear motion driving force via the feed screw 12b, and the brake pad 11a is pressed against the brake disc 11b by the linear motion driving of the piston 12a. In this manner, the braking power is applied to the rotating brake disc 11b. In the following description, a direction in which the piston 12a approaches the brake disc 11b is set to a positive direction (+), and the opposite direction is set to a negative direction (−).

When the above braking operation is performed, the thrust control unit (motor controller) 3 in the brake control device 10 controls the rotational speed and position of the electric motor 2a to adjust a pushing force of the brake pad 11a. The brake control device 10 estimates the braking power of the brake pad 11a based on thrust detected by a thrust sensor 31 installed in the rotation/linear motion conversion mechanism 12. Furthermore, the brake control device 10 estimates the position of the brake pad 11a based on the rotational position detected by a position sensor 32 installed in the electric motor 2a. The position sensor 32 may be attached to the piston 12a so that the position of the piston 12a can be directly detected.

Here, a control signal line 21, communication lines 22 and 23, and a main power line 26 are connected to the brake control device 10. The internal thrust control unit 3 and the rigidity estimation unit 4 in the brake control device are connected to each other by communication lines 24 and 25. Among the lines, the control signal line 21 is for inputting a control command from a higher control device such as an ECU (electronic control unit) for vehicle control to the brake control device 10.

The communication lines 22 and 23 are for performing communication of information other than the control command with the higher control device. Here, the higher control device and the brake control device 10 are separate, but a control device obtained by integrating both the higher control device and the brake control device 10 may be provided.

Figure 2:
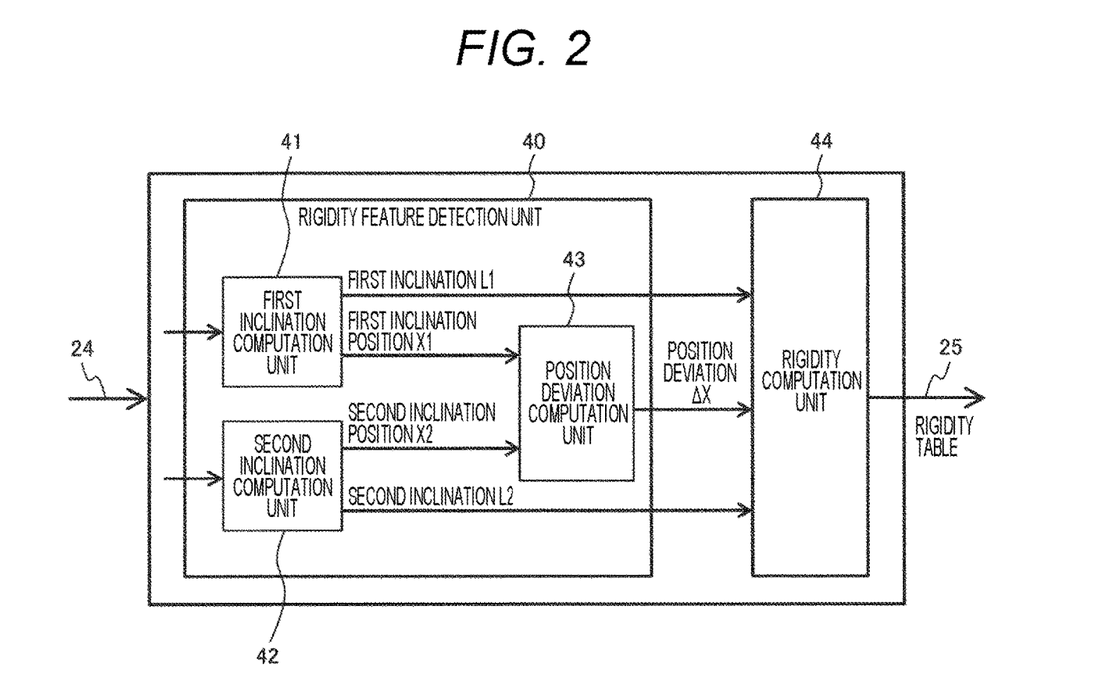
FIG. 2 is a functional block diagram of a rigidity estimation unit according to Embodiment 1.

Next, details of the rigidity estimation unit 4 will be described with reference to FIG. 2. As illustrated in FIG. 2, the rigidity estimation unit 4 includes a rigidity feature detection unit 40, a first inclination computation unit 41, a second inclination computation unit 42, a position deviation computation unit 43, and a rigidity computation unit 44. The rigidity estimation unit receives an input of a signal from the thrust control unit 3 via the communication line 24 and outputs a signal to the thrust control unit 3 via the communication line 25.

The actual rigidity estimation unit 4 includes hardware, for example, a computing device such as a CPU (central processing unit) and a microcomputer, a main storage device such as a semiconductor memory, an auxiliary storage device such as a hard disk, and a communication device. The computing device executes a program stored in the main storage device with reference to a database or the like recorded in the auxiliary storage device, to realize the functions illustrated in FIG. 2. Description will be made below while such known configuration and operation are appropriately omitted.

<<Rigid Feature Detection Unit 40>>

The rigidity feature detection unit 40 uses a thrust value signal from the thrust sensor 31 and a position signal of the piston 12a, which is estimated from the position sensor 32 to compute a first inclination (L1), a second inclination (L2), and a position deviation ($\Delta X$) required for estimating the rigidity and to output the computation results.

<<First Inclination Computation Unit 41>>

The first inclination computation unit 41 performs comparison computation between a thrust value signal and detection threshold values SF1L and SF1H and detects position signals X1L and X1H of the piston 12a at a time point at which the thrust value signal exceeds the threshold value. In this manner, the first inclination computation unit computes the inclination of a thrust increase with respect to the advancing amount of the piston 12a and outputs a first inclination L1 and a position X1 of the piston 12a when the first inclination L1 is computed. At this time, the thrust value signal is generated from the thrust sensor 31 after the piston 12a is moved to the brake disc 11b side, and the brake pad 11a and the brake disc 11b are brought into contact with each other. The detection threshold values are saved as internal values of the first inclination computation unit.

<<Second Inclination Computation Unit 42>>

The second inclination computation unit 42 performs comparison computation between a thrust value signal and detection threshold values SF2L and SF2H and detects position signals X2L and X2H of the piston 12a at a time point at which the thrust value signal exceeds the threshold value. In this manner, the second inclination computation unit computes the inclination of a thrust increase with respect to the advancing amount of the piston 12a and outputs a second inclination L2 and a position X2 of the piston 12a when the second inclination L2 is computed. At this time, the thrust value signal is generated from the thrust sensor 31 after the piston 12a is moved to the brake disc 11b side, and the brake pad 11a and the brake disc 11b are brought into contact with each other. The detection threshold values are saved as internal values of the second inclination computation unit.

<<Position Deviation Computation Unit 43>>

The position deviation computation unit 43 computes the position deviation $\Delta X$ from a difference between the first inclination position X1 and the second inclination position X2 obtained from the first inclination computation unit 41 and the second inclination computation unit 42.

<<Rigidity Computation Unit 44>>

The rigidity computation unit 44 computes the rigidity based on the first inclination L1, the second inclination L2, and the position deviation $\Delta X$.

Here, a generation principle of the rigidity characteristic will be described with reference to FIG. 4. The rigidity characteristic represents a relation of the thrust to the advancing of the piston 12a. During non-braking, the piston 12a is stationary with a clearance for preventing dragging. The piston 12a advances at the time of braking. When the piston moves forward by a clearance amount, the brake pad 11a is pushed and brought into contact with the brake disc 11b, and thrust starts to be generated (A in FIG. 4).

When the piston 12a is further moved forward, the thrust sensor 31 first detects a restoring force caused by deflection (bending) or the like of the brake caliper. After the brake pad 11a and the brake disc 11b come into contact with each other, the brake pad 11a is in a state of leaning toward one side in a range where the brake caliper is deflected (bent). Thus, the characteristic of low apparent rigidity (B in FIG. 4) (increase force with respect to the advancing amount of the piston is small) is obtained.

Figure 4:
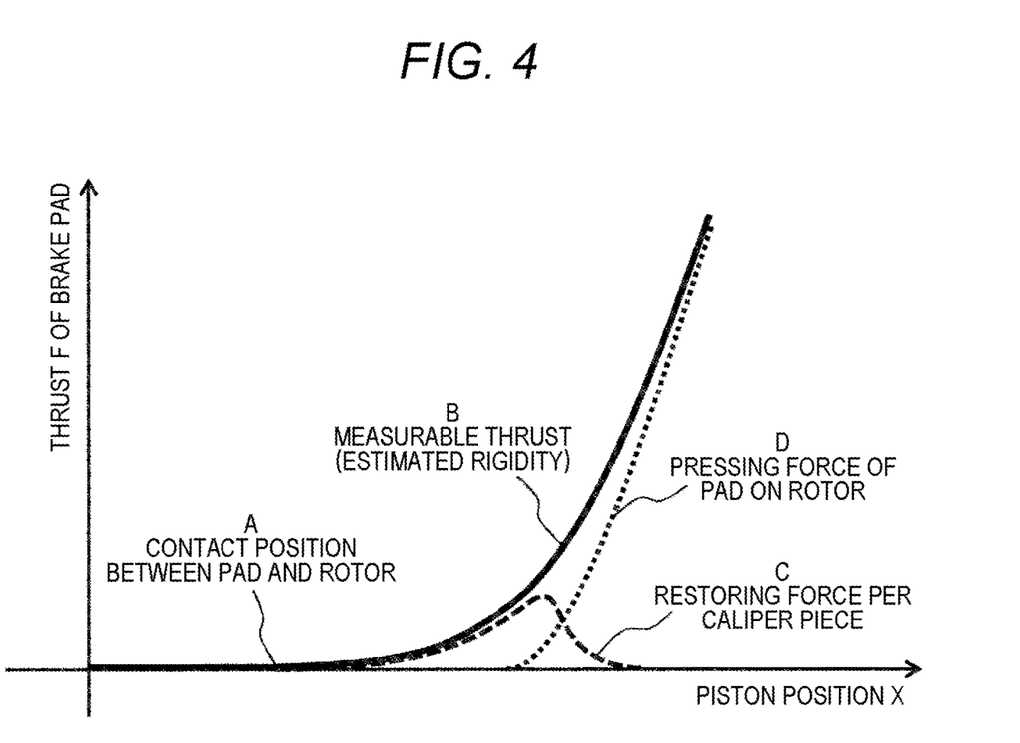
FIG. 4 is a conceptual diagram illustrating a generation principle of rigidity characteristic according to Embodiment 1.

As the piston 12a is further pushed, the piston is restored from the deflected (bent) state, and the restoring force decreases (C in FIG. 4). Then, when the piston 12a is advanced, a state where the brake pad 11a and the brake disc 11b are in a tangential state, that is, a state where the brake pad 11a approaches the brake disc 11b in a positive direction and comes into contact with the brake disc b occurs. Thus, the increase force due to the rigidity of the pure brake pad 11a is obtained (D in FIG. 4).

The rigidity computation unit 44 computes the rigidity based on the first inclination L1, the second inclination L2, and the position deviation $\Delta X$ in order to appropriately capture the rigidity changes.

Figure 5:
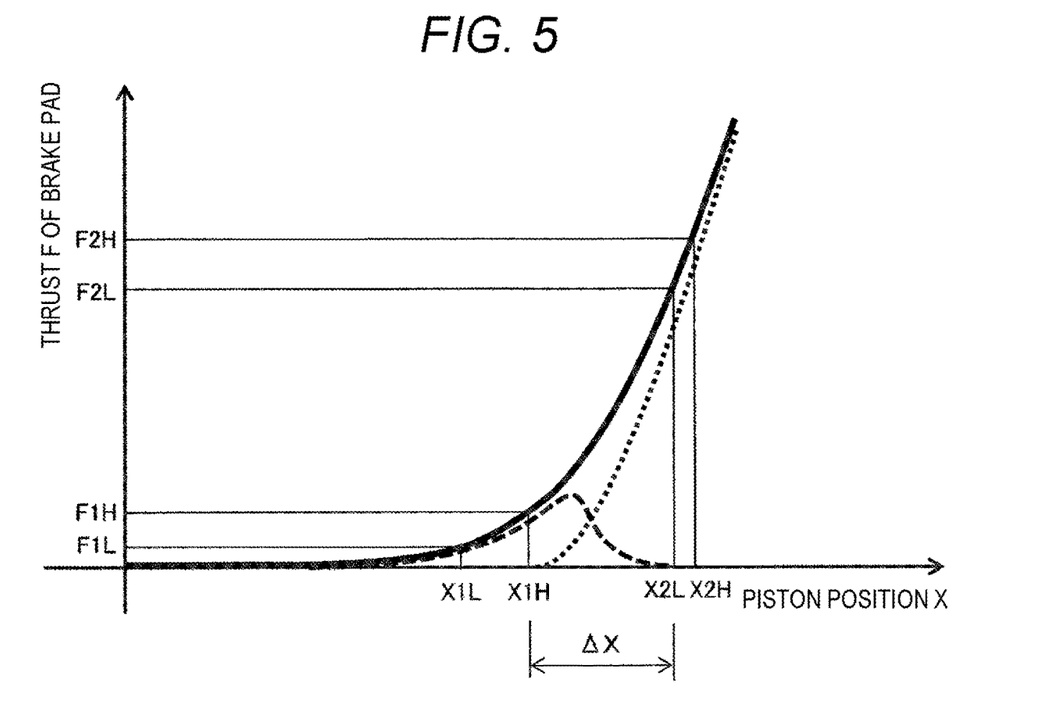
FIG. 5 is a computation conceptual diagram of a rigidity computation unit according to Embodiment 1.

Here, parameters used for the rigidity computation will be described with reference to FIG. 5. The first inclination computation unit 41 saves values F1L and F1H of the thrust sensor 31 and values of the piston positions X1L and X1H at a time point of exceeding the threshold values SF1L and SF1H, and computes the inclination L1=(F1H−F1L)/(X1H−X1L). The second inclination computation unit 42 also performs similar computation (computation of the second inclination L2), and further computes $\Delta X$ being the difference between the positions of the first inclination L1 and the second inclination L2.

Although the rigidity is computed by using the three parameters (L1, L2, $\Delta X$), as a method of computing the rigidity, for example, it is conceivable to extract the parameters at a design stage from various pieces of rigidity data experimentally obtained and to construct an estimation model corresponding to a rigidity change by regression analysis. The estimation model at this time is, for example, Equation (1) as follows.

$$f(Z1,Z2,Z3)=c+\alpha*Z1+\beta*Z2+\gamma*Z3 \quad (1)$$

where:
f(Z1, Z2, Z3): estimated piston position (rigidity characteristic) at certain thrust
Z1: first inclination (L1)
Z2: second inclination (L2)
Z3: position deviation ($\Delta X$)
c, $\alpha$, $\gamma$, $\gamma$: regression coefficient In the regression analysis, the regression coefficient in Equation (1) can be set such that the estimation error is minimized. Thus, the rigidity can be estimated with high accuracy with respect to the rigidity change.

The regression model may be designed in advance or may be learned during traveling. In short, it is sufficient that the rigidity can be estimated using the information of the first inclination (L1), the second inclination (L2), and the position deviation ($\Delta X$).

The functional blocks of the rigidity estimation unit 4 illustrated in FIG. 2 are actually executed by software stored in a memory of a microcomputer. Next, the computation flow will be described with reference to FIG. 3.

Figure 3:
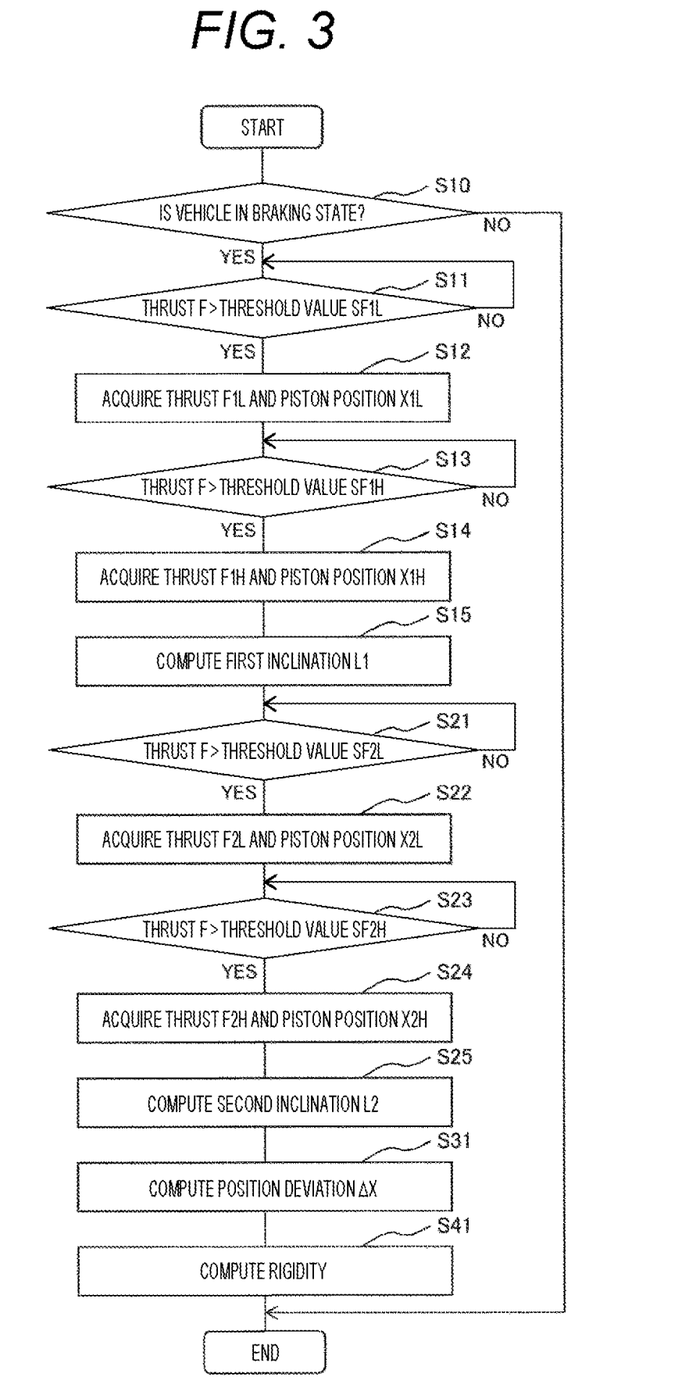
FIG. 3 is a flowchart illustrating a rigidity estimation computation method according to Embodiment 1.

<<Step S10>>
In Step S10, it is determined whether a vehicle is currently in a braking state. This determination can be made based on whether a driver steps on a brake pedal by a predetermined amount or more and the thrust command value is equal to or more than 0. When the vehicle is in a non-braking state (NO), the vehicle exits to the end and waits for the next activation timing. When the vehicle is in the braking state (YES), the process proceeds to the next Step S11.

<<Step S11>>
Step S11 mainly corresponds to the process in the first inclination computation unit 41. In Step S11, comparison computation between the threshold value SF1L and the output F of the thrust sensor 31 installed in the rotation/linear motion conversion mechanism 12 is performed. When F is equal to or less than the threshold value (NO), the process waits. When F is equal to or more than the threshold value (YES), the process proceeds to Step S12.

<<Step S12>>
Step S12 mainly corresponds to the process in the first inclination computation unit 41. In Step S12, the value F1L of the thrust sensor 31 and the value X1L of the position sensor 32 at the time of exceeding the threshold value are saved and stored in the memory. Then, the process proceeds to Step S13.

Here, the pieces of information are stored in a temporary storage area of a RAM (random access memory) included in the microcomputer, and are used for computation performed in the following control step. Other information can be detected depending on the brake system 1.

<<Step S13>>
Step S13 mainly corresponds to the process in the first inclination computation unit 41. In Step S13, comparison computation between the threshold value SF1H and the output F of the thrust sensor 31 installed in the rotation/linear motion conversion mechanism 12 is performed. When F is equal to or less than the threshold value (NO), the process waits. When F is equal to or more than the threshold value (YES), the process proceeds to Step S14.

<<Step S14>>
Step S14 mainly corresponds to the process in the first inclination computation unit 41. In Step S14, the value F1H of the thrust sensor 31 and the value X1H of the position sensor 32 at the time of exceeding the threshold value are saved and stored in the memory. Then, the process proceeds to Step S15.

<<Step S15>>
Step S15 mainly corresponds to the process in the first inclination computation unit 41. In Step S15, the first inclination L1=(F1H-F1L)/(X1H-X1L) is computed from the pieces of information obtained in Steps S11 to S14.

<<Step S21>>
Step S21 mainly corresponds to the process in the second inclination computation unit 42. In Step S21, comparison computation between the threshold value SF2L and the output F of the thrust sensor 31 installed in the rotation/linear motion conversion mechanism 12 is performed. When F is equal to or less than the threshold value (NO), the process waits. When F is equal to or more than the threshold value (YES), the process proceeds to Step S22.

<<Step S22>>
Step S22 mainly corresponds to the process in the second inclination computation unit 42. In Step S22, the value F2L of the thrust sensor 31 and the value X2L of the position sensor 32 at the time of exceeding the threshold value are saved and stored in the memory. Then, the process proceeds to Step S23.

<<Step S23>>
Step S23 mainly corresponds to the process in the second inclination computation unit 42. In Step S23, comparison computation between the threshold value SF2H and the output F of the thrust sensor 31 installed in the rotation/linear motion conversion mechanism 12 is performed. When F is equal to or less than the threshold value (NO), the process waits. When F is equal to or more than the threshold value (YES), the process proceeds to Step S24.

<<Step S24>>
Step S24 mainly corresponds to the process in the second inclination computation unit 42. In Step S24, the value F2H of the thrust sensor 31 and the value X2H of the position sensor 32 at the time of exceeding the threshold value are saved and stored in the memory. Then, the process proceeds to Step S25.

<<Step S25>>
Step S25 mainly corresponds to the process in the second inclination computation unit 42. In Step S25, the second inclination L2=(F2H−F2L)/(X2H−X2L) is computed from the pieces of information obtained in Steps S21 to S24.

<<Step S31>>
Step S31 mainly corresponds to the process of the position deviation computation unit 43. In Step S31, the difference $\Delta X$=X2L−X1H between the piston positions where the first inclination L1 and the second inclination L2 are computed is computed.

<<Step S41>>
Step S41 mainly corresponds to the process of the rigidity computation unit 44. In Step S41, the rigidity characteristic is computed by substituting the first inclination L1, the second inclination L2, and the position deviation $\Delta X$ into the estimation model f(Z1, Z2, Z3) created by the regression analysis at the time of design.

Figure 6:
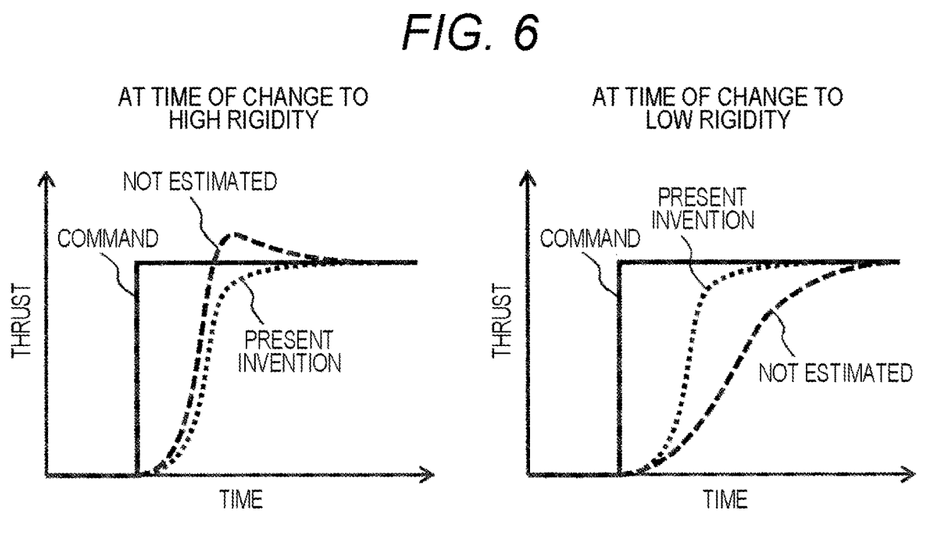
FIG. 6 is a conceptual diagram of an inventive effect according to Embodiment 1.

FIG. 6 illustrates the effects of the present invention. In the present embodiment, it is possible to appropriately estimate the rigidity change by the above computations. For example, when the apparent rigidity changes to high rigidity due to excessive wear of the brake pad 11a, if the rigidity is not estimated, the piston 12a is excessively advanced and the thrust overshoots as indicated by the broken line (not-estimated) on the left in FIG. 6. On the other hand, if the rigidity is appropriately estimated, it is possible to control the thrust without an overshoot as in the dotted line (present invention).

Further, for example, when the brake disc 11b is inclined due to the lateral acceleration during traveling and the apparent rigidity changes to low rigidity, if the rigidity is not estimated, the responsiveness decreases due to the insufficient advancing amount of the piston 12a as indicated by the broken line (not-estimated) on the right in FIG. 6. On the other hand, if the rigidity is appropriately estimated, the responsiveness is improved as indicated by the dotted line (present invention).

In the present invention, since it is possible to estimate the rigidity with high accuracy, it is also possible to detect the contact position (A of FIG. 4) between the brake pad 11a and the brake disc 11b, which is the point at which the thrust starts to increase, with high accuracy. Thus, it is possible to perform piston positioning control during non-braking in which the clearance is kept constant, with high accuracy.

In addition, according to PTL 2, when it is desired to obtain the rigidity characteristics up to high thrust, it is necessary to increase the thrust up to high thrust and measure the thrust. However, in the present invention, if the thrust is increased up to a threshold value required for estimation, it is possible to estimate the rigidity characteristics up to a high thrust region. Therefore, it is possible to perform the estimation by operating only in a normal brake range.

Furthermore, according to PTL 3, there is a concern about an increase in memory load for high accuracy. However, in the present invention, since it is possible to perform the estimation only with the first inclination L1, the second inclination L2, and the position deviation $\Delta X$, a memory consumption amount can be reduced.

As described above, the brake control device 10 in the present embodiment controls the brake including the brake caliper, the brake pad 11a, the brake disc 11b, the piston 12a connected to the brake pad 11a and moving in a linear motion direction by rotation of the electric motor 2a, and the thrust detection unit (thrust sensor 31) that detects the thrust of the brake pad 11a to the brake disc 11b. The brake control device estimates the relation between the position of the piston 12a (being the rigidity of the brake caliper) and the thrust of the brake pad 11a to the brake disc 11b, based on a first piston range (X1H-X1L) which is a thrust change as the first inclination L1 with respect to the position of the piston 12a, and a second piston range (X2H-X2L) which is a thrust change as the second inclination L2 different from the first inclination L1, with respect to the position of the piston 12a.

Further, the rigidity of the brake caliper is estimated based on the difference (position deviation $\Delta X$) between the positions of the first piston range (X1H-X1L) and the second piston range (X2H-X2L).

In addition, the first piston range (X1H-X1L) is a range of a restoring force of deflection in which the brake caliper is deflected and the brake pad 11a leans toward one side. The second piston range (X2H-X2L) is a range of a pressing force after the brake pad 11a becomes tangential to the brake disc 11b.

According to the present embodiment, it is possible to estimate the rigidity and a pad contact position with high accuracy and with a low microcomputer load, and to improve the control performance of the brake.

Embodiment 2

Figure 7:
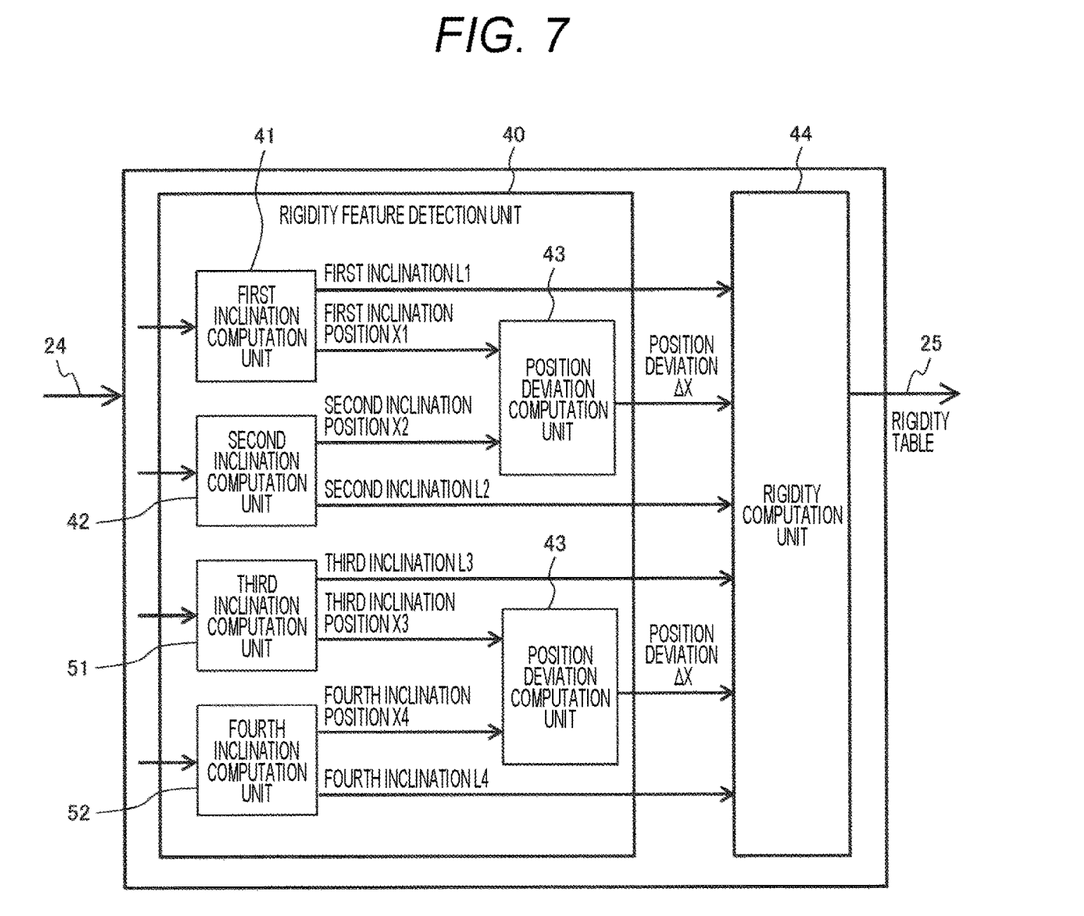
FIG. 7 is a functional block diagram of a rigidity estimation unit according to Embodiment 2.

A brake system according to Embodiment 2 of the present invention will be described with reference to FIG. 7. FIG. 7 is a functional block diagram of a rigidity estimation unit in the present embodiment, and corresponds to a modification of Embodiment 1 (FIG. 2). Repetitive descriptions of points common to Embodiment 1 will be omitted.

As illustrated in FIG. 7, the rigidity estimation unit in the present embodiment is obtained by adding a third inclination computation unit 51 and a fourth inclination computation unit 52 to the configuration in Embodiment 1 (FIG. 2).

For example, the rigidity is estimated based on a third piston range that is a thrust change as a third inclination L3 different from the first inclination L1 and the second inclination L2, with respect to the position of the piston 12a, in addition to the first inclination L1 and the second inclination L2. Furthermore, the rigidity is estimated based on a fourth piston range that is a thrust change as a fourth inclination L4 different from the first inclination L1, the second inclination L2, and the third inclination L3, with respect to the position of the piston 12a, in addition to the first inclination L1, the second inclination L2, and the third inclination L3.

When the change in rigidity is complicated, and it is not possible to obtain sufficient rigidity estimation accuracy with the first inclination L1 and the second inclination L2, it is possible to achieve high accuracy by adding the third inclination L3 and the fourth inclination L4 and performing the estimation.

Embodiment 3

Figure 8:
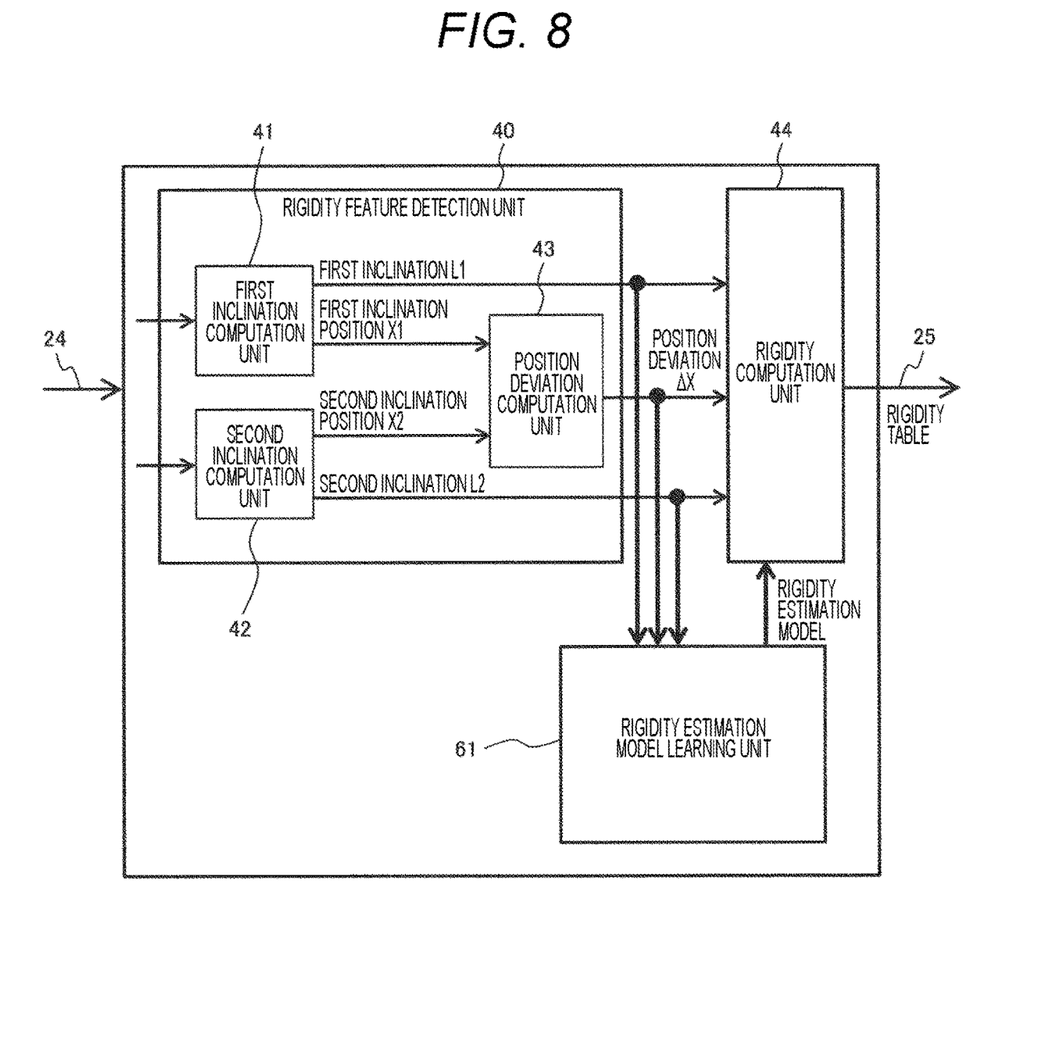
FIG. 8 is a functional block diagram of a rigidity estimation unit according to Embodiment 3.

A brake system according to Embodiment 3 of the present invention will be described with reference to FIG. 8. FIG. 8 is a functional block diagram of a rigidity estimation unit in the present embodiment, and corresponds to a modification of Embodiment 1 (FIG. 2). Repetitive descriptions of points common to Embodiment 1 will be omitted.

As illustrated in FIG. 8, the rigidity estimation unit in the present embodiment is obtained by adding a rigidity estimation model learning unit 61 to the configuration in Embodiment 1 (FIG. 2). As described above, in Embodiment 1, the rigidity estimation model constructed in advance at the time of design is used. However, as in the present embodiment, the rigidity may be measured in real time during traveling or stopping, and the estimation model may be sequentially learned. Thus, it is possible to construct an estimation model capable of coping with a peculiar rigidity change that has not been considered at the time of design.

In each of the above embodiments, the electric brake of an automobile has been described as an example of an application target of the brake control device and the control method thereof according to the present invention. The present invention is not limited thereto. For example, the present invention can also be applied to an electric brake mounted on a railway, an elevator, or the like in addition to the automobile, and it is possible to obtain the similar effects.

In each of the above embodiments, the brake caliper 5 has been described as an example of the braking unit in the present invention. The present invention can be applied to a brake control device having a drum brake type electric cylinder unit that pushes a brake shoe against a drum rotating together with a wheel, and a brake control method of the electric cylinder unit, and it is possible to obtain the similar effects.

The present invention is not limited to the above embodiments, and various modifications may be provided. For example, the above embodiments are described in detail in order to aid in understanding the present invention, and are not necessarily limited to a case including all the described components. Further, some components in one embodiment can be replaced with the components in another embodiment, and the configuration of another embodiment can be added to the configuration of one embodiment. Regarding some components in the embodiments, other components can be added, deleted, and replaced.

REFERENCE SIGNS LIST 1 brake system
2 drive mechanism
2a electric motor
2b reducer
3 thrust control unit (motor controller)
4 rigidity estimation unit
5 brake caliper (braking unit)
10 brake control device
11 braking mechanism
11a brake pad (friction member)
11b brake disc (braking target member)
12 rotation/linear motion conversion mechanism
12a piston
12b feed screw
21 control signal line
22 to 25 communication line
26 main power line
31 thrust sensor
32 position sensor
40 rigidity feature detection unit
41 first inclination computation unit
42 second inclination computation unit
43 position deviation computation unit
44 rigidity computation unit
51 third inclination computation unit
52 fourth inclination computation unit
61 rigidity estimation model learning unit

The invention claimed is:

1. A brake control device that controls a braking unit including a friction member pushed on a braking target member, a piston that abuts on the friction member and moves in a linear motion direction by rotation of an electric motor, and a thrust detection unit that detects thrust of the friction member to the braking target member,
wherein the brake control device is configured to estimate rigidity of the braking unit based on:
a first inclination defined by a difference between the thrust of the friction member at a first position and at a second position of the piston, the first position and the second position being in a first piston position range, wherein the first position corresponds to a first threshold value and the second position corresponds to a second threshold value,
a second inclination different from the first inclination defined by a difference between the thrust of the friction member at a third position and at a fourth position of the piston, the third position and the fourth position being in a second piston position range, wherein the third position corresponds to a third threshold value and the fourth position corresponds to a fourth threshold value, and
a difference between the positions of the piston in the first piston position range and the second piston position range,
wherein the brake control device is configured to estimate the rigidity of the braking unit after determining that:
the thrust of the friction member to the braking target member is greater than the first threshold value, the first position of the piston determined at a time that the thrust of the friction member to the braking target member is greater than the first threshold value is determined;
the thrust of the friction member to the braking target member is greater than the second threshold value, the second position of the piston determined at a time that the thrust of the friction member to the braking target member is greater than the second threshold value is determined,
the thrust of the friction member to the braking target member is greater than the third threshold value, the third position of the piston determined at a time that the thrust of the friction member to the braking target member is greater than the third threshold value is determined; and
the thrust of the friction member to the braking target member is greater than the fourth threshold value, the fourth position of the piston determined at a time that the thrust of the friction member to the braking target member is greater than the fourth threshold value is determined, and
wherein the brake control device is configured to output the estimated rigidity of the braking unit for control of the braking unit.

2. The brake control device according to claim 1, wherein the first piston position range is a range of a restoring force caused by deflection of the braking unit, and
the second piston position range is a range of a pressing force after the friction member becomes tangential to the braking target member.

3. The brake control device according to claim 1, wherein the rigidity is estimated further based on a third inclination different from the first inclination and the second inclination, the third inclination defined by a difference between the thrust of the friction member at a fifth position and at a sixth position of the piston, the fifth position and the sixth position being in a third piston position range.

4. The brake control device according to claim 1, further comprising a rigidity estimation model learning unit that sequentially learns an estimation model for estimating the rigidity.

5. A brake control method of controlling an electric motor of a braking unit that pushes a friction member, the brake control method comprising:
determining that a thrust of the friction member is greater than a first threshold value;
recording a first position of the friction member at a time of determining that the thrust of the friction member is greater than the first threshold value;
determining that the thrust of the friction member is greater than a second threshold value;
recording a second position of the friction member at a time of determining that the thrust of the friction member is greater than the second threshold value;
determining that the thrust of the friction member is greater than a third threshold value;
recording a third position of the friction member at a time of determining that the thrust of the friction member is greater than the third threshold value;

determining that the thrust of the friction member is greater than a fourth threshold value;

recording a fourth position of the friction member at a time of determining that the thrust of the friction member is greater than the fourth threshold value;

estimating rigidity of the braking unit based on a first inclination defined by a difference between the thrust of the friction member at the first position and at the second position of a piston, the first position and the second position being in a first piston position range, a second inclination different from the first inclination defined by a difference between the thrust of the friction member at the third position and at the fourth position of the piston, the third position and the fourth position being in a second piston position range, and a difference between the positions of the piston in the first piston position range and the second piston position range; and output the estimated rigidity for control of the braking unit.

6. The brake control method according to claim 5, wherein the first piston position range is a range of a restoring force caused by deflection of the braking unit, and the second piston position range is a range of a pressing force after the friction member becomes tangential to a braking target member.

7. The brake control method according to claim 5, wherein the rigidity is further estimated based on a third inclination different from the first inclination and the second inclination, the third inclination defined by a difference between the thrust of the friction member at a fifth position and at a sixth position of the piston, the fifth position and the sixth position being in a third piston position range.

8. The brake control method according to claim 5, further comprising sequentially learning an estimation model for estimating the rigidity.

\* \* \* \* \*